May 26, 1970   J. SCHWARZ   3,513,922
PRICE-INDICATING WEIGHING SCALES
Filed March 20, 1968   2 Sheets-Sheet 2

Inventor:
Josef SCHWARZ
by: Arthur O. Klein
his Attorney

United States Patent Office 3,513,922
Patented May 26, 1970

---

3,513,922
PRICE-INDICATING WEIGHING SCALES
Josef Schwarz, Balingen, Wurttemberg, Germany, assignor to Bizerba-Werke Wilhelm Kraut KG, Balingen, Wurttemberg, Germany, a firm
Filed Mar. 20, 1968, Ser. No. 714,529
Claims priority, application Germany, Mar. 30, 1967,
B 91,841
Int. Cl. G01g 23/22
U.S. Cl. 177—25                      10 Claims

ABSTRACT OF THE DISCLOSURE

A weighing scale for weighing goods and indicating the price thereof. A weighing member which assumes a position according to the weight of the goods is scanned by a scanning means comprising a follow-up mechanism which is supported for adjustable movement by a price-indicating means which is movable from a given starting position to a price-indicating position. A coarse adjusting means coacts with the follow-up mechanism to adjust the latter coarsely to a given whole currency unit per unit of weight while a fine adjusting means also coacts with the follow-up mechanism for precisely adjusting the latter to a fractional currency unit per unit of weight, both of these adjusting means coacting additively with each other for positioning the scanning means at a selected unit price per unit of weight. A detent means coacts with the scanning means for precisely positioning the latter at the selected whole currency unit per unit of weight after the price-indicating means moves away from its starting position toward its price-indicating position.

BACKGROUND OF THE INVENTION

The present invention relates to weighing scales.

In particular, the present invention relates to weighing scales which can be set at a selected cost unit per unit of weight and which are capable of indicating the price of the weighed goods.

Weighing scales of this general type, as used in retail establishments, for example, are capable of being preset at a given unit price, which is to say at a given price per unit of weight, so that when a weighing member of the scale assumes a position corresponding to the weight of the goods and is fixed in this position, the price of the goods, equal to the product of the weight thereof times the unit price, can then be indicated by a suitable price-indicating structure.

There is a known construction, for example, shown in German Pat 1,205,720, where a scanning element coacts with a price-indicating means and is adjusted by way of a steel tape which is acted upon by a tape drum and which can be moved with respect to a unit price indicating scale of sufficiently large diameter so as to be adjusted to the unit price. While this unit price adjustment is indeed relatively accurate and of a relatively simple construction, nevertheless the operations required in connection therewith are relatively complex and lead to errors in adjustment particularly in the case of inexperienced personnel. This is particularly true when the unit price must be reset at every weighing operation, as occurs, for example, with scales used in many retail establishments. Furthermore, with such a known construction the adjusting scale is spread over a large area and is relatively difficult to read.

SUMMARY OF THE INVENTION

It is accordingly a primary object of the present invention to provide a construction of the above general type which will avoid the above drawbacks.

In particular, it is an object of the present invention to provide an extremely accurate setting for the unit price of the weighed goods.

Also, it is an object of the present invention to provide an adjusting structure which can adjust the scale to the unit price without any possible error even when the adjustment is made by inexperienced personnel.

Furthermore, it is an object of the present invention to provide a simple structure which can be operated in an exceedingly simple manner for providing extreme convenience in the adjustment and for reliably eliminating the possibility of error.

In accordance with the invention, the weighing scale includes a weighing means for weighing the goods, this weighing means having a weighing member which assumes a position determined by the weight of the goods. A follow-up mechanism coacts with the weighing member for scanning the position thereof, and a price-indicating means carries the follow-up mechanism and supports the latter for adjustable movement. This price-indicating means has a given starting position and is supported by a guide means for movement from this starting position to a price-indicating position. A coarse adjusting means coacts with the follow-up mechanism for coarsely adjusting the latter to a selected whole currency unit per unit of weight, and a fine adjusting means coacts also with the follow-up mechanism for very precisely adjusting the latter to a selected fractional currency unit per unit of weight, the coarse and fine adjusting means coacting additively with each other for determining the position of scanning means on the follow-up mechanism. A detent means coacts with the scanning means for precisely positioning the latter at the selected whole currency unit per unit of weight which has previously been coarsely adjusted by the coarse adjusting means, and this detent means acts to provide this precise adjustment for the whole currency unit only after the price-indicating means moves away from its starting position and approaches its price-indicating position.

BRIEF DESCRIPTION OF DRAWINGS

The invention is illustrated by way of example in the accompanying drawings which form part of this application and in which.

DESCRIPTION OF A PREFERRED EMBODIMENT

Figure 1:
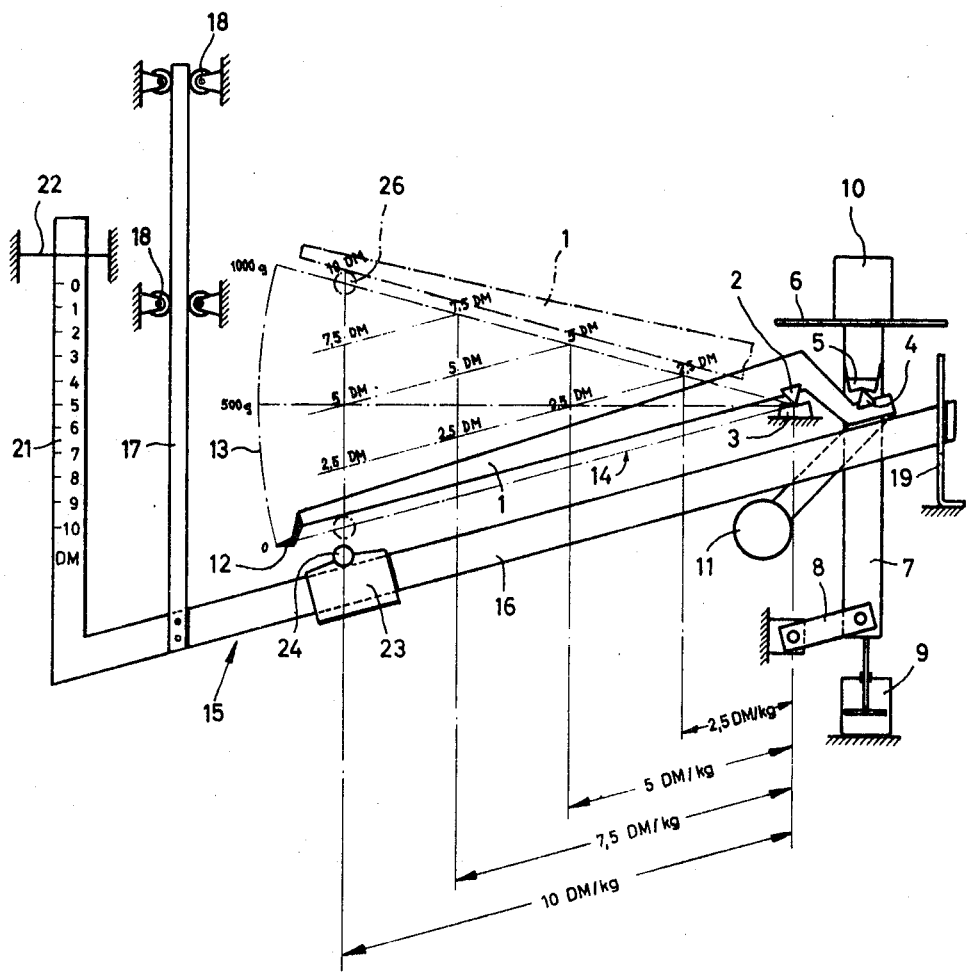
FIG. 1 is a schematic illustration of a weighing scale having a price-indicating structure.

Referring first to FIG. 1, there is schematically illustrated therein the structure and manner of operation of a weighing scale capable of indicating the price of the weighed goods. The weighing means illustrated in FIG. 1 includes a weighing member 1 in the form of a swingable lever having a knife edge 2 resting on a seat 3 which is carried by the unillustrated frame of the scale, so that the lever 1 will swing about an axis coinciding with the edge of element 2 which engages the seat 3. One of the arms of the lever or weighing member 1 is provided with a load-receiving knife edge 4 engaged by a seat 5 carried by the loading pan 6 which receives the goods 10 which are to be weighed. In order to guide the pan 6, an elongated member 7 is connected thereto, and this member 2 is connected by a link 8 to the frame of the scale. The elongated member 7 is provided with a damping unit 9 which damps the swinging of the scale and reduces as much as possible the time until the swinging stops and the member 1 remains at the position which it assumes according to the weight of the goods 10. The weighing member 1 is fixedly connected with a conventional tilting weight 11.

The longer arm of the weighing lever 1 is provided with a pointer 12 which during swinging of the scale 1 moves along a graduated scale 13 which has weight graduations. In the illustrated example, the maximum weight of the scale is 1000 g. or 1 kg. Thus, in the fully loaded position of the scale the pointer 12 will indicate the weight of 1000 g. at the scale 13, while when the scale is half-loaded the pointer 12 will indicate the weight value of 500 g. and the lever 1 will extend horizontally.

Between the tip of the pointer 12 and the knife edge 2 there extends a theoretical scanning line 14 which is parallel to the lower edge of the lever 1 and which is indicated with a dot-dash line in FIG. 1.

For the purpose of determining and indicating the final cost of the weighed goods there is a follow-up mechanism 15 which carries a scanning means 23, 24 which is supported by the follow-up mechanism 15 for shiftable movement. This follow-up mechanism includes an elongated bar 16 which extends parallel to the scanning line 14 when the follow-up mechanism 15 is in its starting position illustrated in FIG. 1. A guide means guides the follow-up mechanism for movement from its starting position upwardly to a price-indicating position, and this guide means includes an elongated guide rod 17 fixed to and extending upwardly from the bar 16 and guided for vertically movement in guide rollers 18, these guide rollers acting to maintain the axis of the guide rods 17 perpendicular to the horizontal half-load position of the member 1. An additional, forked guide 19 (see also FIG. 2) which receives an end of the bar 16 between the limbs of the forked guide 19 prevents turning of the bar 16 out of the plane of FIG. 1. The follow-up mechanism further includes an elongated price-indicating member 21 carrying a scale of prices and fixed at its bottom end to the left end of the bar 16, as viewed in FIG. 1. This price-indicating member 21 extends parallel to the guide rod 17 and coacts with a stationary index 22 which indicates at the scale of prices on the member 21 the total price of the goods which are weighed. This index 22 will in practice advantageously be wider than the scale 21 and will take the form of a horizontally extending line or crosshair, so that it is possible for the vertically extending scale 21 to shift through relatively small distances horizontally to the right and left with respect to the index 22, without providing any undesirable influence on the reading of the scale 21.

The follow-up mechanism includes a slider 23 which is carried by and longitudinally slidable along the bar 16, and the slider 23 further includes the elongated scanning finger or pin 24 forming an elongated scanning member of cylindrical configuration which is fixed to and projects horizontally from the slider 23 perpendicularly to the plane of FIG. 1. The radius of the cylindrical scanning member 24 is precisely equal to the distance of the theoretical scanning line 14 from the lower edge of the lever 1. The distance of the scanning member 24 from the knife edge 2 corresponds to a given unit price, which is a given currency value per unit of weight as, for example, German marks per kg., dollars per pound, or the like. FIG. 1 illustrates the unit prices corresponding to given positions of the scanning means along the bar 16, and it is clear that instead of the selected currency unit being German marks (DM), it is also possible to provide any other desired currency unit such as dollars or the like.

The weighing process for determining the total price of the goods 10 which are placed on the pan 6 is carried out in the following manner:

When the weighing means is in its unloaded zero position, the weighing member 1 is blocked in an unillustrated manner. In this blocked zero position of the weighing member 1, shown in solid lines in FIG. 1, the lower edge of the member 1 extends parallel to the bar 16 and the distance of the scanning member 24 from the line 14 is the same in all positions of the slider 23 along the bar 16. In this position the bar 16 is in its starting location where the index 22 is located at a predetermined distance above the zero graduation of the price scale 21.

If while the weighing member 1 is in its zero position the follow-up mechanism 15 is moved upwardly by an unillustrated drive so that the rod 17 moves upwardly in the guide 18 of the guide means which guides the price-indicating member 21 for movement, this movement will continue until the scanning member 24 engages the lower edge of the lever 1, and at this time the index 22 will be accurately aligned with the zero price value graduation of the scale of member 21. At this latter setting, the slider 23 of the scanning member 24 can shift along the bar 16 without resulting in any change in the indicated price, as is required since in the unloaded position of the scale the price for any unit price setting will still be zero.

If the goods 10 has a weight of 1000 g., so that the scale will be displaced through its full range, and the scanning member 24 is set at a unit price for the particular goods of 10 DM/kg., which is the position illustrated in FIG. 1, then the price-indicating means 15 will be capable of moving without any resistance upwardly until the scanning member 24 reaches the position 26 shown in dot-dash lines in FIG. 1 to engage the lever 1 which is also shown in the full-load position in dot-dash lines. Inasmuch as the last graduation of the scale on the member 21 indicates a value of 10 DM, and is situated from the zero graduation by the same distance as the length of the path of movement of the scanning member 24 up to the position 26, the index 22 will at this time indicate the total price of 10 DM for the goods 10.

If the scale is loaded with goods having a weight of 500 g. and the unit price is also 10 DM/kg., then the weighing lever 1 will assume its horizontal position, and when the scanning member 24 engages the lever 1 the index 22 will indicate at the scale of the member 21 a value of 5 DM.

Thus, this is the manner in which the structure of FIG. 1 operates to provide at the scale of the member 21 an indication of the price of the goods which is determined by the distance of the scanning member 24 from the knife edge 2 (turning axis of the member 1) and by the position assumed by the lever 1 and the engagement of the lever 1 in this latter position by the scanning means so that the price-indicating means will indicate at the scale of the member 21 the product of the unit price multiplied by the particular weight.

As is apparent from the above considerations, the accurate indication of the price of the scale in the member 21 depends to a very large extent on the precise positioning of the scanning member 24 along the bar 16 at a position corresponding to the selected unit price. The following description in connection with FIG. 2 illustrates how such a precise positioning of the scanning member 24 is achieved with the structure of the invention.

Figure 2:
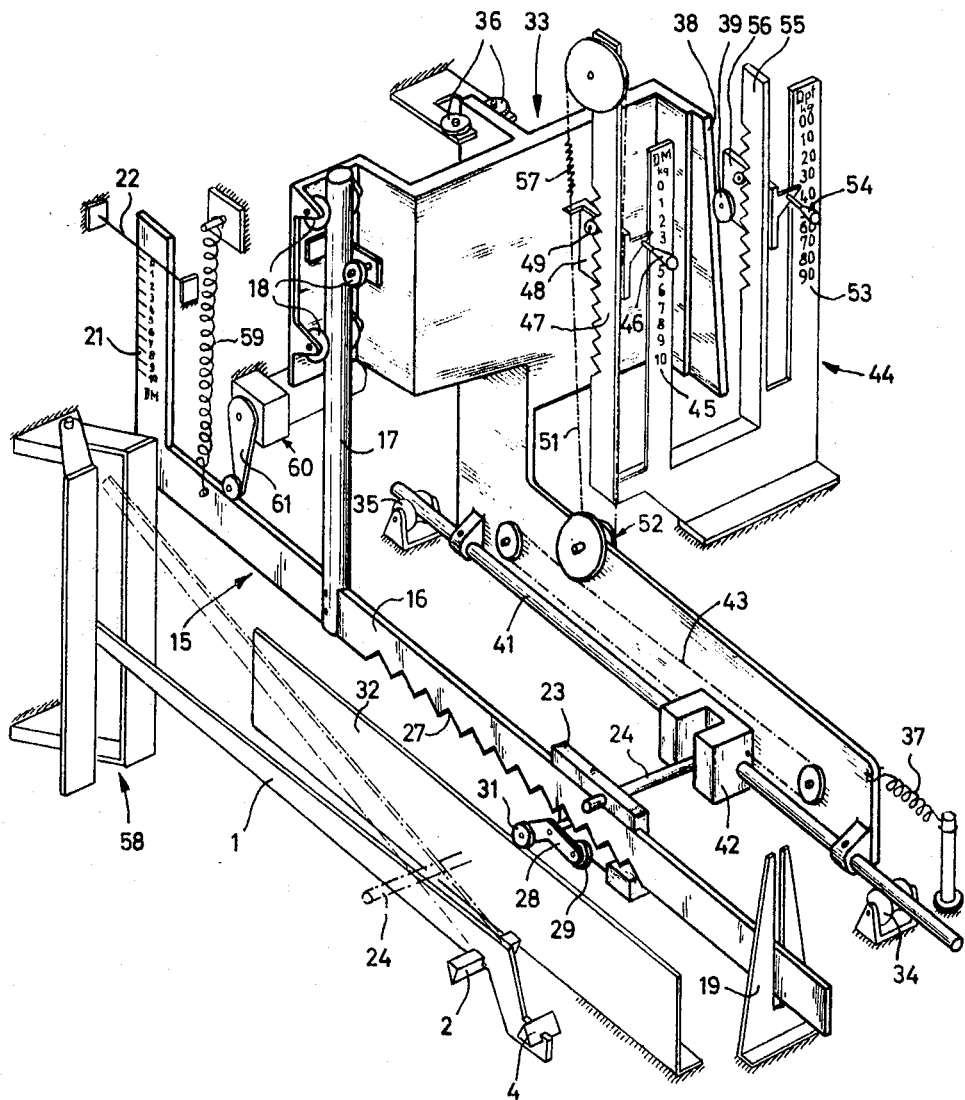
FIG. 2 is a perspective partly schematic fragmentary illustration of a preferred form of a structure according to the invention for indicating the price of the weighed goods and having the structure of the invention for setting the unit price.

Referring now to FIG. 2, only those parts of the structure which are required to provide a full understanding of the structure of the invention are illustrated. The weighing member 1 with the pair of knife edges 2 and 4 are illustrated in FIG. 2, as contrasted with their actual position, somewhat forwardly and to the left of its actual position in the structure so that the bar 16 and the slider 23 will not be covered by the member 1. The same is true of the front end of the scanning member 24 which is shown in dot-dash lines in FIG. 2 shift forwardly and to the left from its actual position in the structure.

FIG. 2 illustrates the vertically extending guide rod 17 of the guide means for the follow-up mechanism 15, this guide rod 17 being guided by the rollers 18 and being fixed at its bottom end to the elongated bar 16 of the follow-up mechanism 15, as pointed out above. Along its lower edge the bar 16 is formed with a series of detent notches 27 of V-shaped configuration, and these notches 27 are very accurately formed in the bar 16 so that their distance will accurately correspond to an adjustment of the scanning member 24 from one whole currency unit per unit of weight to the next whole currency unit per unit of weight. Such whole currency unit can be a German mark, an American dollar, a British pound, or the like. The slider 23 carries a detent member 28 which coacts with the notches 27 to form a detent means for precisely positioning the scanning means 23, 24 along the bar 16 at a selected whole current unit per unit of weight. This detent member 28 is in the form of a swing lever turnably carried by the slider 23 and having an angled configuration so as to form a bell crank. One end of the lever 28 is adapted to coact with the notches 27 and for this purpose is provided with a roller 29. Under the influence of an unillustrated spring the member 28 is constantly urged to turn in a direction which will situate the roller 29 in one of the notches 27 so as to provide in this way a precise positioning of the slider 23 and thus of the scanning member 24 in accordance with a selected whole currency unit per unit of weight.

When the bar 16 is in its starting position shown in FIG. 2, with the scale of the member 21 having its zero graduation situated below the index 22, as pointed out above, this being the position which is required for adjustment of the slider 23 along the bar 16, an elongated stationary rail 32 which extends parallel to the bar 16 has its upper edge in engagement with a roller 31 mounted at the lower end of the lever 28 so as to maintain the latter in opposition to the unillustrated spring at a position where the upper end of detent member 28 will be situated beyond the detent notches 27. This rail 32 is fixedly carried by the unillustrated frame structure. Thus, at this time the detent member 28 will be maintained out of engagement with the notches 27 of the detent means. Only when the follow-up mechanism 15 moves upwardly away from its starting position toward a price-indicating position will the roller 31 move upwardly away from the rail 32 so as to be free of the latter, and now the unillustrated spring can turn the lever 28 to a position where the roller 29 will be received in a notch 27 so as to precisely determine the position of the slider 23 and the scanning member 24.

The guide means 17, 18 which guides the price-indicating means for movement is operatively connected with and carried at the rollers 18 by a movable adjusting assembly 33 which forms part of a fine adjusting means of the invention.

This movable adjusting assembly 33 is movable in a direction parallel to the longitudinal axis of the bar 16 by way of rollers 34, 35, and 36 which are carried for rotary movement by the frame structure of the scale, and a spring 37 coacts with the assembly 33 to urge the latter toward the right, as viewed in FIG. 2. In this way the spring 37 serves to maintain an inclined surface 38 of the assembly 33 in engagement with a roller 39. An elongated rod 41 is fixed to and forms part of the assembly 33 and is guided by the rollers 34 and 35 referred to above. This rod 41 supports, for shifting movement, a shifting fork 42 which is shifted along the rod 41 by a pulley-and-cable assembly which is manually operable and which with the shifting fork 42 forms part of a manually operable coarse adjusting means. A cable 43, which is guided around suitable pulleys carried by the assembly 33, is fixed to the fork 42 so as to shift the latter in response to movement of the cable 43 of the pulley-and-cable assembly. The shifting fork 42 is formed with a vertically extending groove which receives a mating free end of the scanning member 24 so that the latter cannot shift horizontally with respect to the fork 42 but is free to move vertically with respect thereto. Thus, when the fork 42 is shifted along the rod 41 the slider 23 will be correspondingly shifted along the bar 16. At the same time when the bar 16 moves vertically the member 24 can move upwardly in the groove of the fork 42.

A manually operable unit price selecting unit 44 which forms part of the coarse and fine adjusting means referred to below is fixedly carried by the frame of the scale. This unit 44 includes a scale 45 of whole currency units such as German marks per kilogram, for example. A manually engageable member 46 is connected with a carriage 48 and is movable therewith along the scale 45. This carriage 48 can coact with the detent notches of a bar 47 and for this purpose carries a detent roller 49 which can be received in a selected one of the detent notches of the bar 47 when the manually engageable member 46 situates a pointer of the carriage 48 at a selected whole currency unit per unit of weight. In this way it is possible to position the carriage 48 at a position corresponding to a selected number of whole German marks per kilogram, for example. The notches formed in the bar 47 are relatively flat so that an unillustrated spring which urges the roller 49 into one of these notches will not provide any great resistance to upward or downward shifting movement of the manually operable structure 46, 48 with the roller 49 being capable of moving along the rail 47 while snapping into and being displaced out of the detent notches thereof. Furthermore, it is possible for the operator to press inwardly on the member 46 so as to maintain the roller 49 beyond the notches of the bar 47 so that the carriage 48 can be smoothly moved until it is in the region of a selected whole currency unit per unit of weight In this way it is possible to smoothly move the carriage 48 in a noiseless manner along the bar 47. The cable-and-pulley assembly which includes the cable 43 also includes a cable 51 connected to the carriage 48 and guide over pulleys which include a pulley unit 52 interconnecting the cables 51 and 43 and turnably carried by the movable adjusting assembly 33 of the fine adjusting means, so that in response to movement of the carriage 48 the shifting fork 42, and thus the scanning member 24 will be moved. The cable 51 can include a spring 57 in order to take into account the forces required for the movement of the assembly 33 in its entirety on the rollers 34, 35, 36.

The manually operable unit price setting structure 44 further includes a scale 53 of fractional currency units per unit of weight. Thus, where the whole currency unit scale 45 is in dollars, the fractional currency unit scale 53 will be in cents, where the whole currency unit scale 45 is in pounds the fractional currency unit scale 53 will be in shillings, and where the whole currency unit scale 45 is in German marks, as illustrated in FIG. 2, the fractional currency unit scale 53 will be in German pennies. This fractional currency unit selecting structure forms part of the fine adjusting means and includes a manually engageable member 54 connected to a carriage 56 which coacts with a bar 55 formed with detent notches in the same way as the bar 47 so that it is possible in this way to situate the carriage 56 at a selected position corresponding to a selected fractional currency unit. In this case also it is possible to locate the detent roller beyond the detent notches of the bar 55 by pressing inwardly on the member 54 in opposition to an unillustrated spring.

Thus, the fine adjusting means of the invention includes the manually operable assembly 53–56, the movable assembly 33, and also in accordance with the invention, a step-down transmission connected between and coacting with these assemblies. This step-down transmission includes, in the illustrated example, the inclined surface 38 and the roller 39 against which the surface 38 is urged by the spring 37, this roller 39 being carried by the carriage 56. Thus, this step-down transmission may be characterized as an inclined-plane type of step-down transmission, and it is apparent that in response to a given vertical displacement of the carriage 56 the movable assembly 33 will be horizontally displaced through only a small fraction of this vertical displacement. While in the illustrated example the fractional currency unit are in graduations of 10 Dpf/kg, it is apparent that it is also possible to provide fractional currency unit graduations which differ from one to the next by increments of 5 Dpf/kg., or any other desired increment may be provided between the fractional currency units. The same of course applies to the scale 45 of whole currency units.

As is schematically shown at the lower left of FIG. 2., a clamping means 58 is provided for clamping the weighing member 1 in the position to which it swings in response to placing of goods of a given weight on the scale. This clamping means 58 for releasably holding the member 1 in its position determined by the weight of the goods is actuated by an unillustrated device which is capable of releasing one clamping jaw, for example, for swinging movement toward another clamping jaw to clamp the member 1 therebetween. In this way the lever 1 will be blocked in a position determined by the weight of the goods, so that the lever 1 can then be engaged by the scanning member 24. The bar 16 is urged upwardly by a spring 59, and the release of the follow-up mechanism 15 for upward movement from its starting position by the spring 59 is brought about by way of a schematically illustrated release mechanism 60 which serves to turn a blocking lever 61 upwardly away from the bar 16 so that the spring 59 will be free to raise the follow-up mechanism 15 upwardly until the scanning member 24 engages the lever 1.

When the unit price is set by the operator, the follow-up mechanism 15 is in its illustrated starting position where the rail 32 maintains the detent member 28 beyond the detent notches 27. The operator will move the manually engageable member 46 to a selected graduation of the scale 45, and in this way the cable-and-pulley assembly will displace the shifting fork 42 so as to provide in this way a coarse adjustment of the scanning member 24, the cable-and-pulley assembly forming together with the shifting fork 42 and the manually operable setting structure 45–48 the coarse-adjusting means of the invention. During this coarse adjustment the roller 31 will simply ride along the rail 32 and the roller 29 will be maintained beyond the notches 27 of the detent means of the invention.

Now the operator will set the fractional currency unit per unit of weight by engaging the member 54 and moving it along the scale 53 to the selected fractional currency unit. In this way the roller 39 will be displaced with respect to the inclined surface 38 so that the movable assembly 33 of the fine adjusting means will be shifting to a greater or lesser extent along the axis of the rod 41. It is to be noted that at this time, through the connection of the guide means 17, 18 between the assembly 33 and the bar 16, the entire follow-up mechanism 15 moves as a unit together with the assembly 33 of the fine adjusting means, so that at this time the scanning member 24 is very precisely positioned according to the selected fractional currency unit and does not have any movement with respect to the bar 16 or the assembly 33. Thus, this fine adjusting means will provide the adjustment in the illustrated example for a given value of Dpf/kg., and it is to be noted that the fine adjusting means and coarse adjusting means coact additively to determine the position of the shifting fork 42 and thus of the scanning means 23, 24. In other words, the position provided by way of the fine adjusting means is added to the position provided by way of coarse adjusting means. The inclined surface 38 coacts with the roller 39 to provide a step-down transmission of the inclined-plane type, as pointed out above. Thus, the entire unit 33 will be shifted through a relatively small distance in response to a relatively large increment of movement of the member 54. Even with a relatively large extent of movement of the member 54 the assembly 33 will move only through a distance of a few millimeters. Thus, through this relatively simple step-down transmission an extremely accurate positioning of the scanning member 24 is achieved. Instead of a step-down transmission which includes an inclined surface 38 coacting with a roller 39 to form an inclined-plane type of transmission, it is also possible to use other type of precise step-down transmissions, such as a screw-type of transmission.

With the whole currency unit per unit of weight thus coarsely set and the fractional currency unit per unit of weight thus precisely set, the operator will place the goods which are to be weighed on the scale, and after the member 1 has swung to the position determined by the weight of the goods and is clamped in this position by the clamping means 58, the release device 60 is actuated to raise the blocking lever 61 so that the spring 59 can now move the follow-up mechanism 15 upwardly with the rod 17 now being guided in its upward movement by the rollers 18. During this upward movement the lever 28 will of course move beyond the rail 32 so that the roller 29 can enter into a notch 27. Because of the precise structure of the detent notches 27, the swing lever 28, which forms the detent member which coacts with these notches, will provide for the scanning means 23, 24 a very precise position in accordance with the selected whole currency unit, this precise position being provided for the initially coarse position according to the selected whole currency unit, and it is to be noted that this detent means 27–29 of the invention comes into play only after the follow-up mechanism 15 has moved away from its starting position and approaches its price-indicating position. Thus, when the price is actually indicated the scanning member 24 is very precisely positioned not only in accordance with the fractional currency unit but also in accordance with the whole currency unit.

Inasmuch as the shifting fork 42 does not restrain the scanning member 24 from upward movement, this scanning member will move up with the follow-up mechanism 15 until it engages the lower edge of the weighing member 1. Now the scale of the member 21 together with the index 22 will give an accurate reading of the total price of the goods, or, if desired, the position of the scale of the member 21 with respect to the index 22 can be optically transmitted to any desired location where it can be easily read by the operator.

What is claimed is:
1. In a weighing scale, weighing means for weighing goods and including a weighing lever which assumes a position determined by the weight of the goods, blocking means adapted to block said weighing lever in said position determined by the weight of the goods, a displaceable follow-up mechanism independently mounted with respect to said weighing means and including a scanning pin, price-indicating means for indicating the price of the goods, said follow-up mechanism including price-indicating means and supporting the latter for adjustable movement, guide means guiding said follow-up mechanism for movement from a given starting position to a price-indicating position determined by engagement of said scanning pin with said weighing lever, coarse adjusting means coacting with said scanning pin for coarsely adjusting the latter to a position corresponding to a whole currency unit price per unit of weight, fine adjusting means coacting with said scanning pin for precisely adjusting the latter to a position corresponding to a fractional currency unit per unit of weight, said coarse and fine adjusting means coacting additively with each other for adjusting said scanning pin to a selected position corresponding to a selected unit price per unit of weight, a detent means coacting with said scanning pin for precisely positioning the latter at the whole currency unit per unit of weight for which said canning pin has initially been set by said coarse adjusting means, said detent means precisely positioning said scanning pin at said whole currency unit after said follow-up mechanism has moved away from said starting position thereof and while said price-indicating means approaches said price-indicating position.

2. The combination of claim 1 and wherein said follow-up mechanism includes an elongated bar formed with a series of detent notches forming part of said detent means, said scanning pin including a slider slidable along said bar, and said detent means further including a detent member carried by said slider to enter into one of said detent notches formed in said bar.

3. The combination of claim 2 and wherein said detent member includes a lever swingable on said slider and having one end portion which coacts with said detent notches, and a rail engaging an opposed end portion of said lever when said follow-up mechanism is in said starting position thereof for maintaining said one end portion of said lever displaced from said series of detent notches, so that said detent member will be located beyond said notches of said detent means during coarse adjustment while said follow-up mechanism remains in said starting position thereof.

4. The combination of claim 1 and wherein said coarse and fine adjusting means each includes a manually operable adjusting member to be displaced to a selected position and a detent structure for releasably maintaining said latter member in its selected position.

5. The combination of claim 4 and wherein a spring means coacts with the manually operable member of each of said adjusting means for maintaining said detent structure releasably engaged and said manually operable member being displaced by the operator in opposition to said spring means for disengaging the detent structure.

6. The combination of claim 1 and wherein said fine adjusting means includes a manually operable selecting assembly for selecting a fractional currency unit, a movable adjusting assembly coacting with said scanning pin for adjusting the latter, and a step-down transmission connected between and coacting with said assemblies for moving said movable adjusting assembly through a relatively small fraction of the distance through which said selecting assembly is moved during selection of a given fractional currency unit.

7. The combination of claim 6 and wherein said step-down transmission is an inclined-plane step-down transmission.

8. The combination of claim 6 and wherein said follow-up mechanism and said guide means are operatively connected with said movable assembly of said fine adjusting means for movement therewith, so that said scanning pin moves together with, and not relative to, said price-indicating means and said movable assembly during fine adjustment by said fine adjusting means, said coarse adjusting means being operatively connected to said scanning pin for shifting the patter with respect to said follow-up mechanism and said movable assembly of said fine adjusting means during coarse adjustment by said coarse adjusting means.

9. The combination of claim 8 and wherein said coarse adjusting means includes a shifting fork engaging said scanning pin and a manually operable cable-and-pulley transmission operatively connected to said shifting fork for moving the latter to shift said scanning pin with respect to said follow-up mechanism.

10. The combination of claim 9 and wherein said follow-up mechanism includes an elongated bar formed with a series of detent notches which form part of said detent means, said scanning pin including a slider slidable along said bar and being operatively movably connected with said shifting fork, and said detent means including a detent member carried by said slider to be received in a selected one of said detent notches according to the selected whole currency unit upon movement of said follow-up mechanism away from said starting position thereof toward a price-indicating position, said detent member being in the form of a swing-lever swingably carried by said slider for movement at one end portion of said lever toward said bar into a selected one of said notches thereof, said swing-lever having an opposed end portion distant from said bar, and an elongated rail extending substantially parallel to said bar and engaging said opposite end portion of said swing-lever when said follow-up mechanism is in said starting position thereof for maintaining said one end portion of said lever displaced beyond said notches as long as said follow-up mechanism is in said starting position thereof.

References Cited
UNITED STATES PATENTS

| | | | |
|---|---|---|---|
| 1,190,377 | 7/1916 | Church | 177—25 X |
| 2,445,022 | 7/1948 | Colman. | |
| 3,370,660 | 2/1968 | Takahashi | 177—25 |

STEPHEN J. TOMSKY, Primary Examiner

G. H. MILLER, JR., Assistant Examiner

U.S. Cl. X.R.

177—251